United States Patent
Laur et al.

(10) Patent No.: US 9,594,378 B2
(45) Date of Patent: Mar. 14, 2017

(54) VARIABLE OBJECT DETECTION FIELD-OF-FOCUS FOR AUTOMATED VEHICLE CONTROL

(71) Applicant: Delphi Technologies, Inc., Troy, MI (US)

(72) Inventors: Michael H. Laur, Mission Viejo, CA (US); Serge Lambermont, Maastricht (NL); John P. Absmeier, Capitola, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/815,343

(22) Filed: Jul. 31, 2015

(65) Prior Publication Data

US 2017/0031363 A1    Feb. 2, 2017

(51) Int. Cl.
| | |
|---|---|
| *B60T 7/22* | (2006.01) |
| *G05D 1/02* | (2006.01) |
| *G05D 1/00* | (2006.01) |
| *G08G 1/16* | (2006.01) |
| *G06T 7/00* | (2006.01) |

(52) U.S. Cl.
CPC ......... *G05D 1/0212* (2013.01); *G05D 1/0088* (2013.01); *G05D 1/0231* (2013.01); *G05D 1/0257* (2013.01); *G08G 1/16* (2013.01); *G05D 2201/0212* (2013.01)

(58) Field of Classification Search
CPC .. G05D 1/0212; G05D 1/0231; G05D 1/0088; G06T 7/002; B60T 7/22
USPC ............... 701/26, 96; 348/47; 342/70
See application file for complete search history.

(56) References Cited

U.S. PATENT DOCUMENTS

| | | | | |
|---|---|---|---|---|
| 5,461,357 A | * | 10/1995 | Yoshioka | B60T 7/22 |
| | | | | 180/167 |
| 5,587,762 A | | 12/1996 | Watanabe | |
| 5,929,802 A | * | 7/1999 | Russell | G01S 7/4008 |
| | | | | 342/70 |
| 2010/0127841 A1 | | 5/2010 | D'Ambrosio et al. | |
| 2012/0310466 A1 | | 12/2012 | Fairfield et al. | |
| 2014/0168377 A1 | * | 6/2014 | Cluff | G06T 7/002 |
| | | | | 348/47 |

FOREIGN PATENT DOCUMENTS

| | | |
|---|---|---|
| JP | 2011-165107 A | 8/2011 |
| KR | 10-2014-0106286 A | 9/2014 |

* cited by examiner

*Primary Examiner* — Tan Q Nguyen
(74) *Attorney, Agent, or Firm* — Laurence D. Hazelton

(57) ABSTRACT

A system for automated operation of a host-vehicle includes an object-detection device and a controller. The object-detection device is operable to detect an object in a field-of-view proximate to a host-vehicle. The object-detection device is operable to vary a field-of-focus of the object-detection device used to observe a portion of the field-of-view. The controller is configured to determine, based on information received from the object-detection device, a travel-direction of the object relative to a travel-path of the host-vehicle. The controller is also configured to adjust the field-of-focus of the object-detection device based on the travel-direction.

19 Claims, 2 Drawing Sheets

VARIABLE OBJECT DETECTION FIELD-OF-FOCUS FOR AUTOMATED VEHICLE CONTROL

TECHNICAL FIELD OF INVENTION

This disclosure generally relates to a system for automated operation of a host-vehicle, and more particularly relates to selecting a portion or subset of a field-of-view of an object-detection device where an object resides, and increasing, for example, the framerate and/or resolution of data collection within the selected portion.

BACKGROUND OF INVENTION

It is known to equip an automated vehicle with an object-detection device such as a camera, radar unit, and/or lidar unit. As the sensitivity, framerate, resolution and other performance characteristics continue to increase, the amount of information from such devices may overwhelm the processing capabilities of data/signal/image processors typically found on automated vehicles.

SUMMARY OF THE INVENTION

In accordance with one embodiment, a system for automated operation of a host-vehicle is provided. The system includes an object-detection device and a controller. The object-detection device is operable to detect an object in a field-of-view proximate to a host-vehicle. The object-detection device is operable to vary a field-of-focus of the object-detection device used to observe a portion of the field-of-view. The controller is configured to determine, based on information received from the object-detection device, a travel-direction of the object relative to a travel-path of the host-vehicle. The controller is also configured to adjust the field-of-focus of the object-detection device based on the travel-direction.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
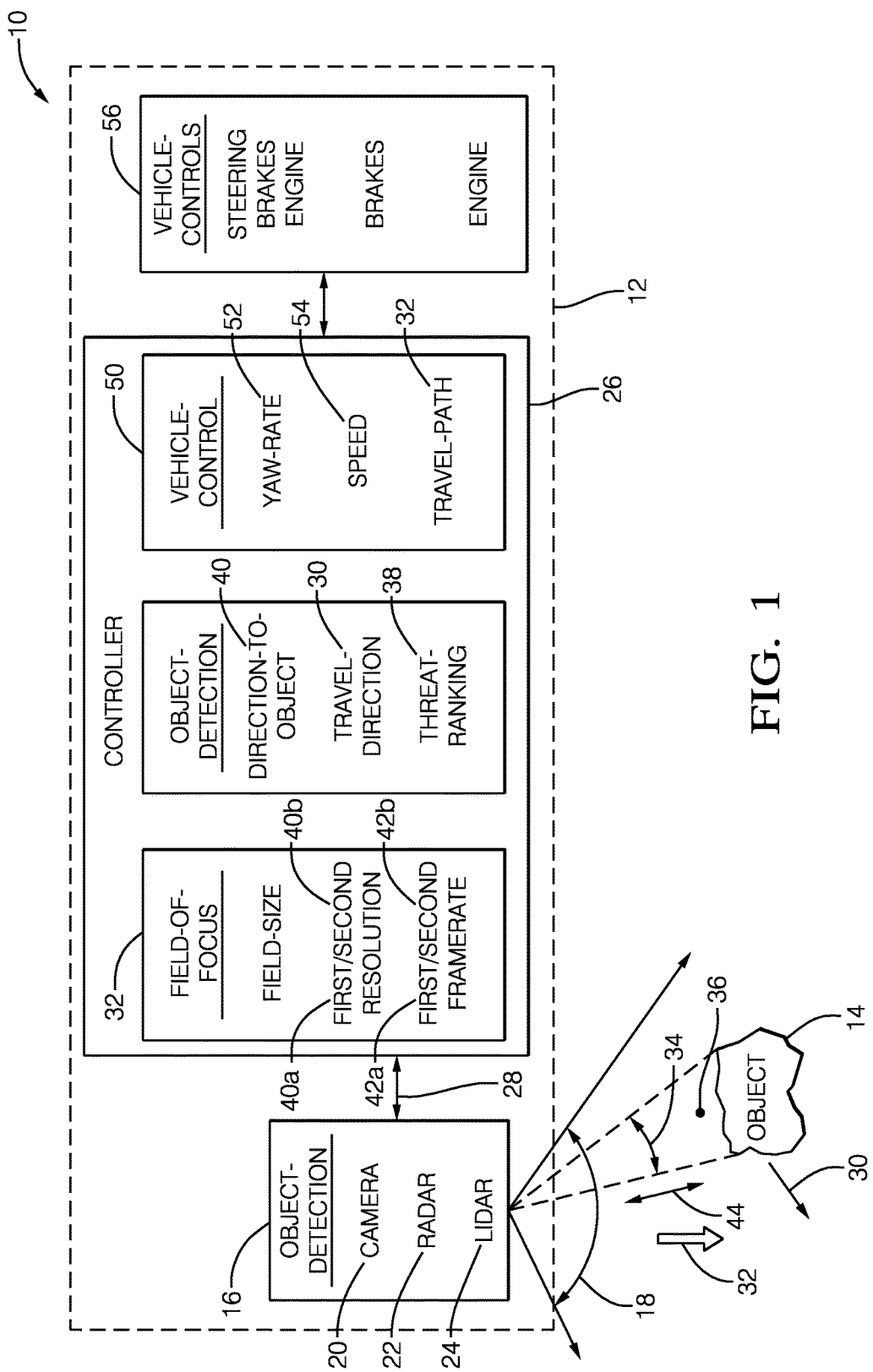
FIG. 1 is a diagram of a system for automated operation a host-vehicle in accordance with one embodiment.

FIG. 1 illustrates a non-limiting example of a system 10 for automated operation of a host-vehicle 12. The host-vehicle 12 may be a fully-automated or autonomous type of vehicle where an operator (not shown) of the host-vehicle 12 is generally not involved with controlling the steering, braking, or acceleration of the host-vehicle 12, i.e. the operator is little more than a passenger. As will become clear in the description of the system 10 that follows, the system 10 is also useful on partially automated vehicles where control by the operator may be over-ridden if necessary to avoid a collision for example, or the operator is merely provided with a warning of the presence of an object 14 proximate to the host-vehicle 12.

The system 10 includes an object-detection device 16 that is generally operable to detect the object 14 in a field-of-view 18 of the object-detection device 16. The object-detection device 16 may include, but is not limited to, any one or combination of an image sensor 20 (e.g. a video camera), a radar sensor 22, and a lidar sensor 24. The system 10 also includes a controller 26 configured to determine, based on information 28 (i.e. one or more signals) received from the object-detection device 16, a travel-direction 30 of the object 14 relative to a travel-path 32 of the host-vehicle 12. The travel-direction 30 of the object 14 may be determined by tracking the location of the object 14 over time in data captured by the object-detection device 16. The travel-path 32 of the host-vehicle 12 may also be determined based on the relative motion of stationary objects (not shown) located around the host-vehicle 12, or based on data received from a vehicle-control block 50 in the controller that may use among other information, a yaw-rate 52 and a speed 54 of the host-vehicle 12.

The system 10 described herein is generally intended for use on passenger vehicles produced by the automotive industry, but other automated/autonomous vehicle applications are contemplated such as automated farming equipment. Those in the automotive business will readily acknowledge that the cost-versus-performance-characteristics of the system 10 must be carefully considered. That is, the cost of the object-detection device 16 and the controller 26 must be carefully considered in view of performance requirements that are specified as necessary to reliably detect and/or properly classify the object 14. Technical advances and cost reductions in the video camera industry have made available high-definition video cameras with increased frame-rates that are relatively inexpensive. As such, the image sensor 20 may be capable of providing more image data (the information 28) than can be processed by a reasonably priced configuration of the controller 26.

The image sensor 20 may be configured to detect light in the visible-light spectrum and/or the infrared-light spectrum, but is not limited to these spectrums, so images from these various spectrums may require separate processing by the controller 26. Corresponding advances in the radar and lidar sensor arts mean that more of the information 28 may be provided to the controller 26 than is necessary to merely detect the presence of the object 14. However, the increased resolution and/or frame-rate may be helpful to classify the object 14 to, for example, determine if the object 14 is a pedestrian, dog, tumbleweed, or other object. If the controller 26 was configured to be capable of processing all of the information 28 available from the object-detection device 16 when advanced versions of the sensors are used, the cost of the controller 26 may be undesirably expensive.

It was recognized that it is generally unnecessary to process all of the information 28 provided by the object-detection device 16 at the highest available resolution and frame-rate for the entirety of the field-of-view 18. That is, for the purpose of merely detecting the presence of some unidentified object, lower than maximum resolution and maximum frame rate of the image sensor 20, the radar sensor 22, and/or the lidar sensor 24 may be adequate. However, to reliably classify the object 14, i.e. determine what the object 14 is, an increased resolution and/or frame-rate may be necessary; greater than what is necessary for mere detection of the object 14.

Accordingly, the object-detection device 16 is advantageously configured or operable to vary a field-of-focus 34 of the object-detection device 16 used to observe a portion 36 of the field-of-view 18. As used herein, to vary the field-of-focus 34 includes, but is not limited to, changing the resolution and/or a frame-rate used to observe the portion 36 to a value that is different from that used to observe the remaining portion of the field-of-view 18 that is outside of the portion 36. By way of example and not limitation, the image sensor 20 (i.e. a video-camera) is operated so the image of the field-of-view 18 within the portion 36 is at maximum resolution and/or frame-rate, while the rest of the field-of-view 18 that is not within the portion 36 is viewed at a lower or reduced resolution and/or frame-rate. Similarly, the radar sensor 22 may be momentarily operated in a narrow-beam mode and/or an increased pulse-rate mode to increase the resolution and/or frame-rate of the information 28 provided by the radar sensor 22. It is also contemplated that increasing the transmit power of the radar sensor 22 could be used to alter the field-of-focus 34. Increasing transmit power would be particularly useful in rural settings where longer distance detection may be useful. Those in the art will recognized that the lidar sensor 24 can also be operated so the portion 36 is observed with increased resolution and/or frame-rate to better determine a classification of the object 14 or likelihood of collision with the object 14.

Figure 2:
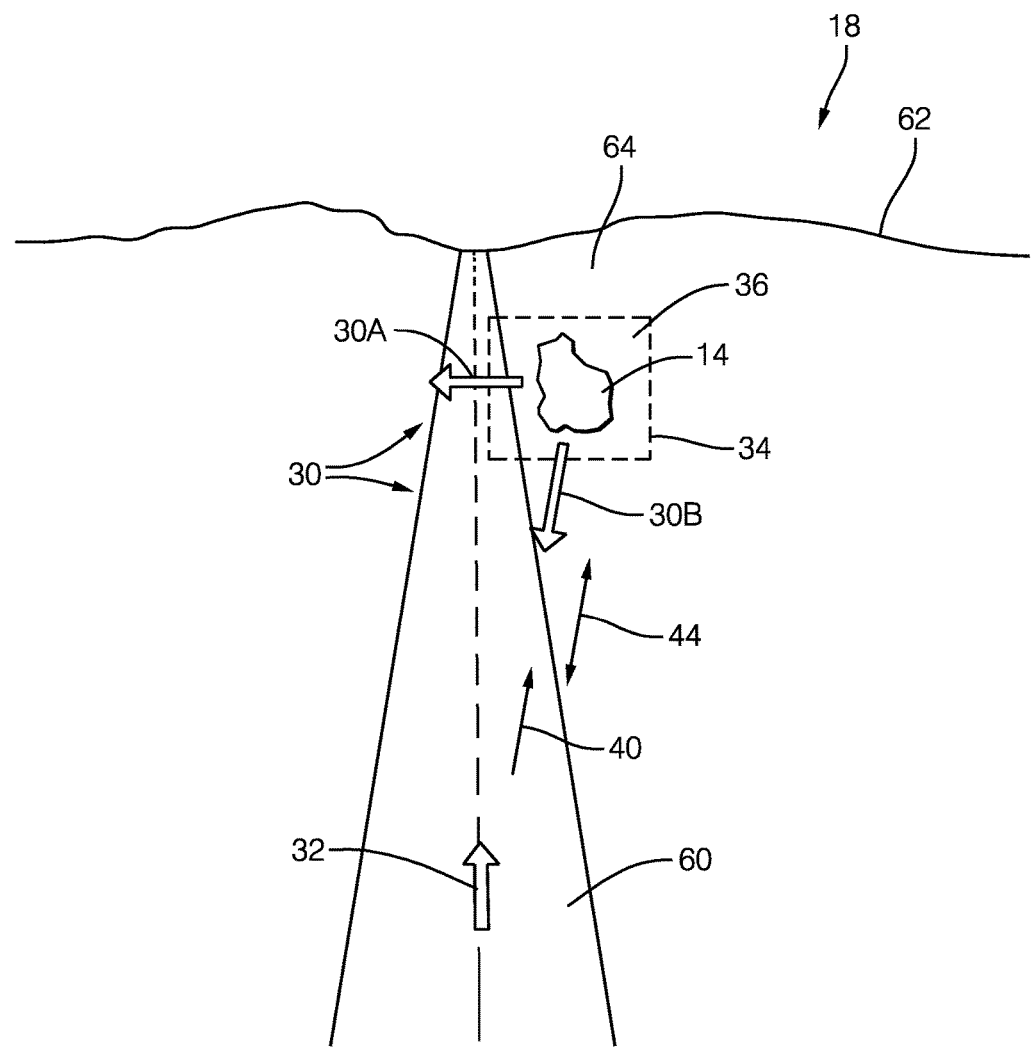
FIG. 2 is an isometric view of landscape navigated by the system of FIG. 1 in accordance with one embodiment.

FIG. 2 illustrates a non-limiting example of the field-of-view 18 from the perspective of the object-detection device 16 (not shown in FIG. 2). The object 14 is located next to a roadway 60 that corresponds to the travel-path 32 of the host-vehicle (not shown), where the roadway 60 extends to a horizon 62. Two possible directions for the travel-direction 30 of the object 14 are illustrated which include a lateral-direction 30A and a radial direction 30B. The significance of the two directions illustrated will become apparent in the description that follows.

Continuing to refer to FIGS. 1 and 2, the controller 26 may be further configured to adjust the field-of-focus 34 based on the travel-direction 30 relative to the travel-path 32. If the travel-direction 30 of the object 14 is towards the travel-path 32 of the host-vehicle 12, i.e. if the travel-direction 30 is likely to intersect the travel-path 32, then the controller 26 may adjust the field-of-focus 34 so the likelihood of intersection, i.e. the likelihood that the object 14 and the host-vehicle 12 may collide, can be calculated or estimated. The controller 26 may be configured to determine a threat-ranking 38 of the object 14 based on, for example, visual-size, speed, radar-signal return strength, or other classification. The threat-ranking 38 may indicate the risk of injury if a collision occurs, so may be used to determine how aggressively the controller 26 should maneuver the host-vehicle via the vehicle-controls 56.

The threat-ranking 38 may be increased when the travel-direction 30 of the object 14 intersects with the travel-path 32 of the host-vehicle 12, i.e. a collision is likely. The threat-ranking 38 may also be increased depending on the classification of the object 14. For example, if the object 14 is classified as a pedestrian and a collision is likely, the threat-ranking is preferably increased so more effective or extraordinary action can be taken to avoid a collision. However, if the object 14 is classified as a wind-blown sheet of newspaper, the threat-ranking 38 may not be increased and no extraordinary effort is made by the system 10 to prevent or avoid a collision.

In one embodiment of the system 10, the object-detection device 16 includes only one of the image sensor 20, the radar sensor 22, and the lidar sensor 24. If the image sensor 20 is selected for example, the image sensor 20 may be operated to capture images of the entirety of the field-of-view 18 at a first-resolution 40A that is less than high-definition, i.e. less than a second-resolution 40B that is equal to high-definition. Then, if the object 14 is detected, the image sensor 20 may be operated so that the portion 36 of the field-of-view 18 is observed or imaged in high-definition and the remainder of the field-of-view 18 may be ignored or continued to be observed the first-resolution 40A. That is, the scanning of the field-of-view 18 within the portion 36 that is the field-of-focus 34 may be done with a different resolution than is used to scan the area of the field-of-view 18 outside of the portion 36 or not the field-of-focus 34. Greater or increased resolution may be useful to more accurately or more quickly classify the object 14 as something that warrants extraordinary action to avoid a collision.

By way of further explanation, the object-detection device 16 may be operated at a first-framerate 42A inside the field-of-focus 34, and a second-framerate 42B less than the first-framerate 42A outside of the field-of-focus 34. An increased frame-rate may be useful to more accurately and/or quickly determine the travel-direction 30 of the object 14 and the travel-path 32 of the host-vehicle 12, and thereby more accurately and/or quickly determine a likelihood of collision. Changing (i.e. increasing) the resolution and/or framerate may also be applicable to the radar sensor 22 and the lidar sensor 24. For the radar sensor 22, the receive antenna may be mechanically or electronically steered or focused in a particular direction, and detected radar returns may be processed or filtered to focus on a particular range, as will be recognized by those in the art. For the lidar sensor 24, the laser beams used to 'illuminate' the object 14 may be more narrowly directed towards the direction of the object 14, and/or the repetition-rate of the laser beams may be increased to increase the effective resolution and framerate, respectively.

In another embodiment of the system 10, the object-detection device 16 may include two sensors, one of each of the image sensor 20, the radar sensor 22, and the lidar sensor 24. For this configuration, one of the two sensors may have a particular advantage over the other sensor with regard to detecting the object 14, and information regarding the direction of and/or range to the object 14 may be used to adjust the field-of-focus 34 of the other sensor. By way of example, the image sensor 20 may have an advantage over the radar sensor 22 when detecting an object with relatively high visual background contrast (i.e. the object has a significantly different color than the background 64) and the object 14 is made of a material that does not strongly reflect a radar signal, e.g. a sheet of paper. Conversely, the radar sensor may 22 have an advantage over the image sensor 20 if the ambient lighting is poor. Presented below are several non-limiting examples of situations when the system 10 uses two of the sensors (20, 22, 24) and one of the sensors has a detection advantage over the other of the sensors. These examples are not intended to suggest that the object-detection device 16 is necessarily limited to only two of the sensors. Rather, the examples suggest a symbiotic relationship between two of the sensors without regard to the presence of, or how useful is, the third sensor may be for detecting and/or classifying the object 14. That is, while the examples focus on the interaction between two of the sensors, the optional presence of the third sensor is contemplated.

One embodiment the object-detection device 16 may consist of (i.e. include only) the image sensor 20 and the radar sensor 22. If the object 14 moves in the lateral-direction 30A, the image sensor 20 may more easily detect the presence of the object 14 because of angular resolutions limitation of a reasonably priced version of the radar sensor 22. In this instance, the information 28 may include data from the image sensor 20 that is used to determine a direction 46 to the object 14 relative to the radar sensor 22 when the object 14 moves laterally (e.g. in the lateral-direction 30A) with respect to the object-detection device 16, and the field-of-focus 34 of the radar sensor 22 may be adjusted based on the direction 46. That is, an estimate of the location of the object 14 relative to the host-vehicle 12 provided by data from the image sensor 20 may be used to adjust or determine the field-of-focus 34 for the radar sensor 22. By operating the radar sensor 22 in an increased resolution mode and/or at an increased framerate, further information about the object 14 may be determined with data from the radar sensor 22. By way of example and not limitation, the radar sensor 22 may not readily detect the object 14 because the object 14 is characterized by a weak radar return due to the material of the object 14. As noted above, data from the image sensor 20 is used to determine the direction 46 to the object 14 relative to the radar sensor 22, and the field-of-focus 34 of the radar sensor 22 is adjusted based on the direction 46.

Alternatively, if the object 14 moves in the radial-direction 30B, the radar sensor 22 may more easily detect the presence of the object 14 because apparent size of the object 14 detected by the image sensor does not noticeably change. In this instance, the information 28 may include data from the radar sensor 22 that is used to determine a direction 46 to the object 14 relative to the image sensor 20 when the object 14 moves radially (e.g. in the radial-direction 30B) with respect to the object-detection device 16, and the field-of-focus 34 of the image sensor 20 may be adjusted based on the direction 46. That is, an estimate of the location of the object 14 relative to the host-vehicle 12 provided by data from the radar sensor 22 may be used to adjust or determine the field-of-focus 34 for the image sensor 20. By operating the image sensor 20 in an increased resolution mode and/or at an increased framerate, further information about the object 14 may be determined with data from the image sensor 20.

By way of further example, the image sensor 20 may not readily detect the object 14 because the object 14 is characterized by a color similar to the background 64, i.e. the object is characterized by a weak-background-contrast. As noted above, data from the radar sensor 22 is used to determine the direction 46 to the object 14 relative to the image sensor 20, and the field-of-focus 34 of image sensor 20 is adjusted based on the direction 46. As will be recognized by those in the art, the radar sensor 22 is also well suited to determine distance or a range 44 to the object 14, and the range 44 may also be used to determine or adjust the field-of-focus of the image sensor 20

In another embodiment the object detection device 16 may consist of the image sensor 20 and the lidar sensor 24. In one example instance, the object 14 may be characterized by a weak lidar return because the object is formed of non-reflective material, or reflects laser beams from the lidar sensor 24 in a direction away from the lidar sensor 24. If the object 14 is readily detected by the image sensor 20, data from the image sensor may be used to determine the direction 46 to the object relative to the lidar sensor, and the field-of-focus 34 of the lidar sensor 24 is adjusted based on the direction 46.

Alternatively, if the object moves radially (in the radial-direction 30B) with respect to the object-detection device 16, or the object has a weak-background-contrast as suggested above, the image sensor 20 may not readily detect the presence of the object 14. In this situation, the lidar sensor 24 may be used to determine a direction 46 and a range 44 of the object relative to the image sensor 20, and the field-of-focus 34 of the image sensor 20 is adjusted based on the direction 46 and the range 44.

In another embodiment the object-detection device 16 may consist of the radar sensor 22 and the lidar sensor 24. If the object 14 is characterized by a weak radar return, data from the lidar sensor 24 may be used to determine the direction 46 and the range 44 to the object 14 relative to the lidar sensor 24, and the field-of-focus 34 of the radar sensor 22 may be adjusted based on the direction 46 and/or the range 44. Alternatively, if the object 14 is characterized by a weak lidar return, data from the radar sensor 22 may be used to determine the direction 46 and the range 44 to the object 14 relative to the lidar sensor 24, and the field-of-focus 34 of the lidar sensor 24 is adjusted based on the direction 46 and the range 44.

Accordingly, a system 10 for automated operation of a host-vehicle 14 and a controller 26 for the system 10 is provided. The system 10 or the controller 26 generally operates the object-detection device 16 at less than maximum resolution and maximum framerate when no object is detected to reduce the quantity of the information 28 output by the object-detection device 16. Doing so reduces the amount of data-processing required from the controller 26, thereby reducing the cost of the controller 26 compared to what would be needed if the object-detection device 16 were operated at maximum resolution and maximum framerate at all times. When an object is detected in the field-of-view 18, the controller 26 determines the field-of-focus 34 for the object-detection device 16 and then operates the object-detection device 16 at increased resolution and/or framerate over the field-of-focus 34 so the increased quantity of the information 28 is only from the portion 36 of the field-of-view 18 and not the entirety of the field-of-view 18. So that the total quantity of the information 28 does not exceed the capability of the controller 26, is it contemplated that the coverage of the area of the field-of-view 18 that is outside of the portion 36 by one or more of the sensors may be ignored or observed at a further reduced resolution and/or framerate.

While this invention has been described in terms of the preferred embodiments thereof, it is not intended to be so limited, but rather only to the extent set forth in the claims that follow.

We claim:

1. A system for automated operation of a host-vehicle, said system comprising:
   an object-detection device operable to detect an object in a field-of-view proximate to a host-vehicle, wherein the object-detection device is operable to vary a field-of-focus of the object-detection device used to observe a portion of the field-of-view different from that used to observe an area outside of the portion; and
   a controller configured to determine, based on information received from the object-detection device, a travel-direction of the object relative to a travel-path of the host-vehicle, and adjust the field-of-focus based on the travel-direction.

2. The system in accordance with claim 1, wherein a threat-ranking of the object is increased when the travel-direction of the object intersects with the travel-path of the host-vehicle.

3. The system in accordance with claim 1, wherein the object-detection device includes one of an image sensor, a radar sensor, and a lidar sensor.

4. The system in accordance with claim 1, wherein the object-detection device operates at a first-resolution inside the field-of-focus, and a second-resolution less than the first-resolution outside of the field-of-focus.

5. The system in accordance with claim 1, wherein the object-detection device operates at a first-framerate inside the field-of-focus, and a second-framerate less than the first-framerate outside of the field-of-focus.

6. The system in accordance with claim 1, wherein the object-detection device includes two sensors, one of each of an image sensor, a radar sensor, and a lidar sensor.

7. The system in accordance with claim 6, wherein the object-detection device includes an image sensor, and a radar sensor.

8. The system in accordance with claim 7, wherein data from the image sensor is used to determine a direction to the object relative to the radar sensor when the object moves laterally with respect to the object-detection device, and the field-of-focus of the radar sensor is adjusted based on the direction.

9. The system in accordance with claim 7, wherein the object is characterized by a weak radar return, data from the image sensor is used to determine a direction to the object relative to the radar sensor, and the field-of-focus of the radar sensor is adjusted based on the direction.

10. The system in accordance with claim 7, wherein data from the radar sensor is used to determine a direction and a range of the object relative to the image sensor when the object moves radially with respect to the object-detection device, and the field-of-focus of the image sensor is adjusted based on the direction and the range.

11. The system in accordance with claim 7, wherein the object is characterized by a weak-background-contrast, data from the radar sensor is used to determine a direction and a range of the object relative to the image sensor, and the field-of-focus of the image sensor is adjusted based on the direction and the range.

12. The system in accordance with claim 6, wherein the object-detection device includes an image sensor, and a lidar sensor.

13. The system in accordance with claim 12, wherein the object is characterized by a weak lidar return, data from the image sensor is used to determine a direction to the object relative to the lidar sensor, and the field-of-focus of the lidar sensor is adjusted based on the direction.

14. The system in accordance with claim 12, wherein data from the lidar sensor is used to determine a direction and a range of the object relative to the image sensor when the object moves radially with respect to the object-detection device, and the field-of-focus of the image sensor is adjusted based on the direction and the range.

15. The system in accordance with claim 1, wherein the object-detection device includes a radar sensor, and a lidar sensor.

16. The system in accordance with claim 15, wherein the object is characterized by a weak radar return, data from the lidar sensor is used to determine a direction and a range to the object relative to the lidar sensor, and the field-of-focus of the radar sensor is adjusted based on the direction and the range.

17. The system in accordance with claim 15, wherein the object is characterized by a weak lidar return, data from the radar sensor is used to determine a direction and a range to the object relative to the lidar sensor, and the field-of-focus of the lidar sensor is adjusted based on the direction and the range.

18. The system in accordance with claim 1, wherein the object-detection device includes an image sensor, a radar sensor, and a lidar sensor.

19. The system in accordance with claim 1, wherein the object-detection device includes an image sensor configured to detect infrared light.

* * * * *